United States Patent
Yamauchi et al.

(10) Patent No.: US 9,992,459 B2
(45) Date of Patent: Jun. 5, 2018

(54) LIGHTING APPARATUS AND LIGHTING SYSTEM

(71) Applicant: Panasonic Intellectual Property Management Co., Ltd., Osaka (JP)

(72) Inventors: Kentaro Yamauchi, Hyogo (JP); Yoshiaki Ueno, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 15/247,435

(22) Filed: Aug. 25, 2016

(65) Prior Publication Data

US 2017/0070710 A1    Mar. 9, 2017

(30) Foreign Application Priority Data

Sep. 4, 2015    (JP) .................................. 2015-174826

(51) Int. Cl.
  *H04N 9/31*        (2006.01)
  *H04N 21/41*       (2011.01)
(52) U.S. Cl.
  CPC ......... *H04N 9/3102* (2013.01); *H04N 9/3179* (2013.01); *H04N 9/3194* (2013.01); *H04N 21/4122* (2013.01)
(58) Field of Classification Search
  USPC ....... 348/766, 750, 759, 725, 724, 719, 714, 348/706, 592, 383, 231.3, 182, 136, 135, 348/70, 50, 49, 48, 47, 46, 42, 34; 382/162, 173, 174, 195, 211; 359/204.2, 359/224.2, 462, 537
  See application file for complete search history.

(56) References Cited

U.S. PATENT DOCUMENTS

| 5,883,700 | A  | * | 3/1999  | Someya  | G03F 7/70358 355/53 |
| 5,991,504 | A  | * | 11/1999 | Hori    | H04N 5/772 386/225 |
| 9,014,542 | B2 | * | 4/2015  | Maeda   | G11B 27/034 386/239 |
| 2004/0184526 | A1 | * | 9/2004 | Penttila | H04N 21/23406 375/240.1 |

(Continued)

FOREIGN PATENT DOCUMENTS

| JP | 2006-279544 A | 10/2006 |
| JP | 2010-103656 A | 5/2010 |

(Continued)

*Primary Examiner* — Jefferey F Harold
*Assistant Examiner* — Brian Yenke
(74) *Attorney, Agent, or Firm* — McDermott Will & Emery LLP (57) ABSTRACT

A lighting apparatus includes: a light modulator which modulates light emitted from a light source, using frames received by a receiver; an illuminator which emits the modulated light; and a controller. The controller periodically performs a storage control which continues for a predetermined period of time and in which, every time the receiver receives a frame, the received frame is stored into a storage. When a detector detects an interruption in the reception of the frames at the receiver, the light modulator modulates the light emitted from the light source, sequentially using two or more consecutive frames stored into the storage.

10 Claims, 9 Drawing Sheets

(56) References Cited

U.S. PATENT DOCUMENTS

| | | | | |
|---|---|---|---|---|
| 2008/0055767 A1* | 3/2008 | Abe | ............... | G11B 5/59627 360/77.11 |
| 2008/0211654 A1* | 9/2008 | Kasamatsu | ............ | B60K 35/00 340/461 |
| 2008/0224986 A1* | 9/2008 | Huang | ............... | G09G 3/3413 345/102 |
| 2008/0298463 A1* | 12/2008 | Stivers | ............... | G09G 5/003 375/240.21 |
| 2009/0141197 A1* | 6/2009 | Kim | ............... | G09G 5/006 348/790 |
| 2009/0268905 A1* | 10/2009 | Matsushima | ............ | G06F 21/10 380/200 |
| 2010/0165003 A1* | 7/2010 | Hiranuma | ............... | G09G 3/002 345/690 |
| 2012/0147073 A1* | 6/2012 | Dahrea | ............... | B41J 2/17509 347/7 |
| 2012/0155753 A1* | 6/2012 | Masato | ............... | H04N 1/6027 382/162 |
| 2013/0082607 A1* | 4/2013 | Gandhi | ............... | G09G 3/3413 315/153 |
| 2014/0225934 A1* | 8/2014 | Liu | ............... | G09G 3/3413 345/690 |
| 2015/0178318 A1* | 6/2015 | Lee | ............... | H04N 1/2116 348/231.3 |
| 2015/0204970 A1* | 7/2015 | Jeong | ............... | G01S 7/4865 356/5.01 |

FOREIGN PATENT DOCUMENTS

| | | |
|---|---|---|
| JP | 2011-077784 A | 4/2011 |
| JP | 2013-211631 A | 10/2013 |
| JP | 2014-167520 A | 9/2014 |

* cited by examiner

LIGHTING APPARATUS AND LIGHTING SYSTEM

CROSS REFERENCE TO RELATED APPLICATION

This application claims the benefit of priority of Japanese Patent Application Number 2015-174826 filed on Sep. 4, 2015, the entire content of which is hereby incorporated by reference.

BACKGROUND

1. Technical Field

The present disclosure relates to a lighting apparatus and a lighting system which emit light modulated according to an illumination pattern such as a moving image.

2. Description of the Related Art

Conventionally, a lighting apparatus is known which is capable of modulating light according to an illumination pattern such as a moving image and emitting the modulated light. Such a lighting apparatus modulates light emitted from a light source by transmitting the light through a transmissive video element, for example.

Japanese Unexamined Patent Application Publication No. 2010-103656 discloses a technique of real-time viewing of content. This lighting apparatus is also capable of receiving, from an imaging apparatus, a moving image which is being captured by the imaging apparatus, and modulating light in real time according to the received moving image. Such a lighting apparatus is problematic in that an interruption in the reception of the moving image due to deterioration of the communication environment etc. causes discomfort for a user.

The present disclosure provides a lighting apparatus and a lighting system that are capable of reducing discomfort for a user which is caused by an interruption in the reception of an illumination pattern such as a moving image.

SUMMARY

A lighting apparatus according to an aspect of the present disclosure includes: a light source; a receiver which sequentially receives frames that are included in an illumination pattern which changes with time; a light modulator which, every time the receiver receives a frame among the frames, modulates light emitted from the light source, using the received frame; an illuminator which emits the modulated light; a storage; a controller which periodically performs a storage control which continues for a predetermined period of time and in which, every time the receiver receives a frame among the frames, the received frame is stored into the storage; and a detector which detects an interruption in reception of the frames at the receiver, wherein when the detector detects an interruption in the reception of the frames at the receiver, the light modulator modulates the light emitted from the light source, sequentially using, among the frames, two or more consecutive frames stored into the storage.

A lighting system according to an aspect of the present disclosure includes: the lighting apparatus described above; an imager; and a transmitter which transmits a moving image captured by the imager, as the illumination pattern to the receiver.

A lighting apparatus according to an aspect of the present disclosure is capable of reducing discomfort for a user which is caused by an interruption in the reception of an illumination pattern.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, a lighting apparatus and a lighting system according to embodiments are described with reference to the Drawings. Note that each of the embodiments described below shows a general or specific example. The numerical values, shapes, materials, elements, the arrangement and connection of the elements, steps, the processing order of the steps, etc., shown in the following embodiments are mere examples, and are not intended to limit the scope of the present disclosure. As such, among the elements in the following embodiments, those not recited in any one of the independent claims which indicate the broadest inventive concepts are described as arbitrary elements.

Furthermore, the respective figures are schematic illustrations and are not necessarily precise illustrations. Additionally, substantially identical elements are assigned the same reference signs, and there are cases where overlapping descriptions are omitted or simplified.

Embodiment 1

Outline

Figure 1:
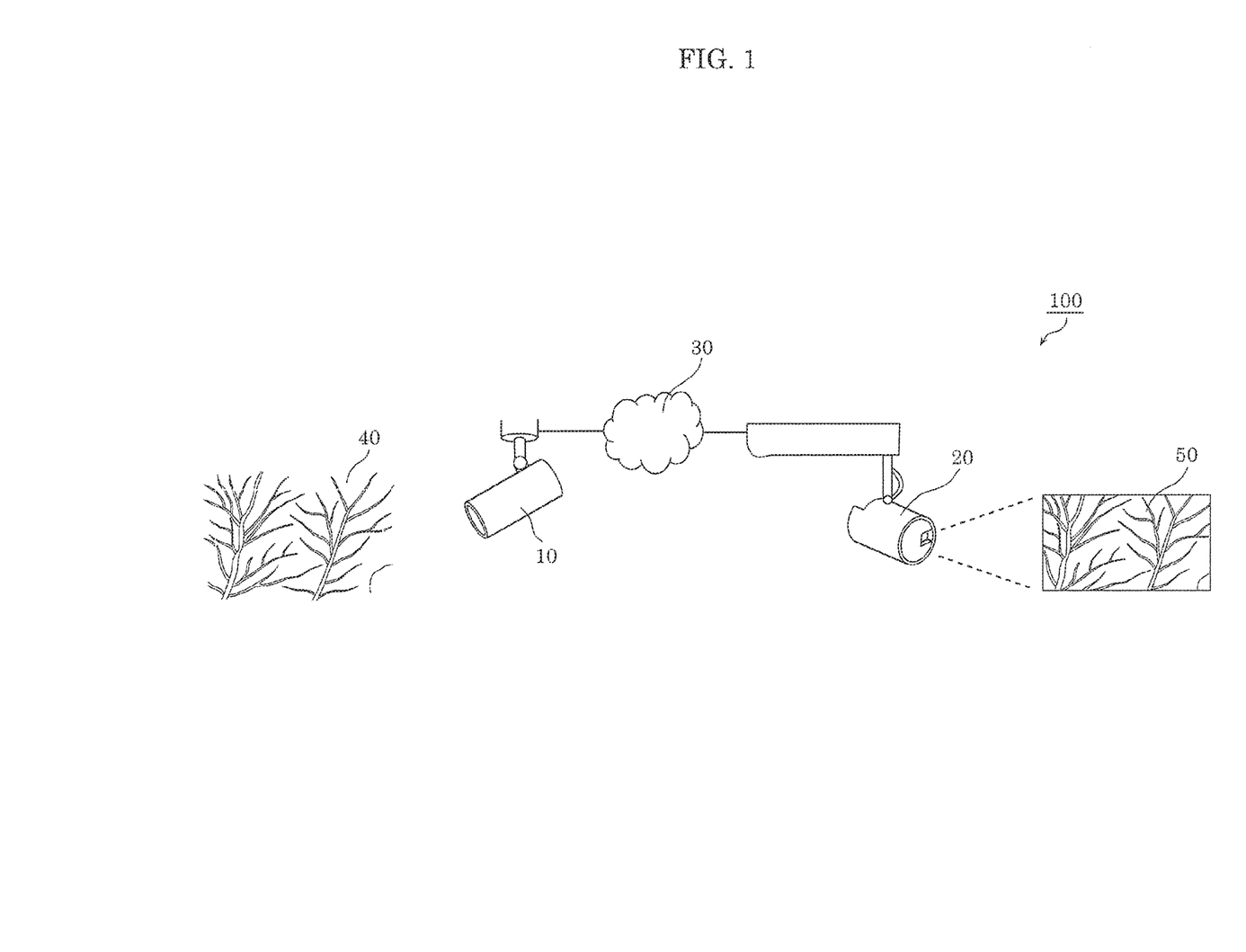
FIG. 1 illustrates an overall configuration of a lighting system according to Embodiment 1.

First, the outline of a lighting system according to Embodiment 1 is described. FIG. 1 illustrates an overall configuration of the lighting system according to Embodiment 1.

As illustrated in FIG. 1, lighting system 100 includes imaging apparatus 10 and lighting apparatus 20. Imaging apparatus 10 and lighting apparatus 20 are connected to each other through communication network 30 and thus are capable of communicating with each other.

For example, imaging apparatus 10 captures landscape 40 such as a forest, and transmits the captured moving image (video) as an illumination pattern to lighting apparatus 20 through communication network 30.

Lighting apparatus 20 receives the illumination pattern and then emits light 50 modulated according to the illumination pattern. Light 50 is emitted by lighting apparatus 20 in real time every time lighting apparatus 20 receives an illumination pattern. This allows a user of lighting apparatus 20 to obtain illuminating light in real time which has the same or similar features as landscape 40 which is being captured by imaging apparatus 10.

[Configuration]

Figure 2:
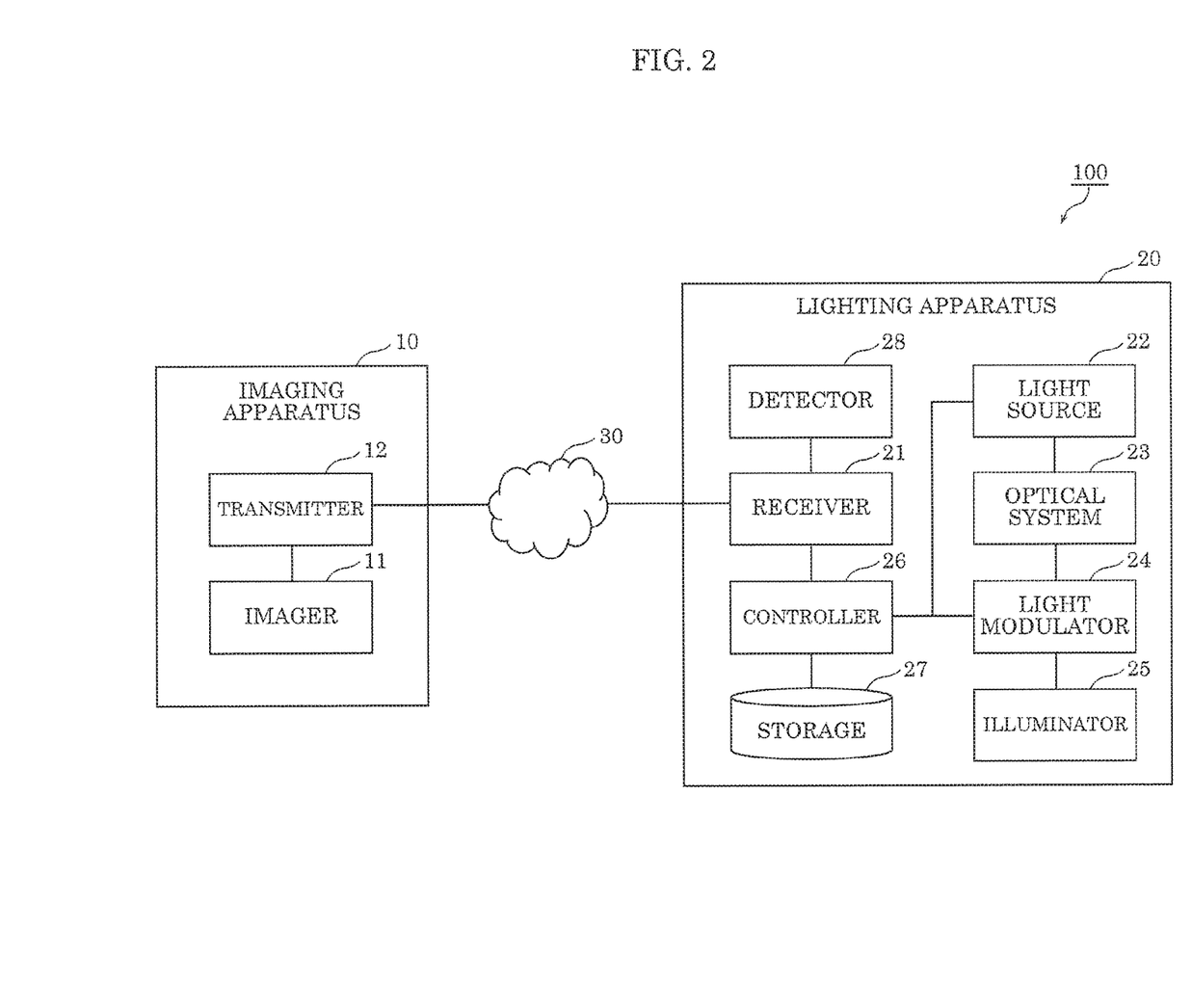
FIG. 2 is a block diagram illustrating a functional configuration of a lighting system according to Embodiment 1.

Next, a detailed configuration of lighting system 100 is described. FIG. 2 is a block diagram illustrating a functional configuration of a lighting system according to Embodiment 1.

As illustrated in FIG. 2, lighting system 100 includes imaging apparatus 10 and lighting apparatus 20. As also illustrated in FIG. 1, imaging apparatus 10 and lighting apparatus 20 are connected to each other through communication network 30. Communication network 30 may be any wired or wireless communication network. Specifically, communication network 30 is a wireless or wired LAN (local area network), the Internet, or the like.

First, imaging apparatus 10 is described. Imaging apparatus 10 includes imager 11 and transmitter 12.

Imager 11 is a device which captures a moving image. An object to be imaged by imaging unit 11 is, for example, a landscape including a forest, and a moving image of such a landscape is transmitted as an illumination pattern which changes with time, to allow lighting apparatus 20 to provide light that is similar to sunshine streaming through leaves. Specifically, imager 11 is a CCD (charge coupled device) camera including a CCD image sensor, and may be a CMOS (complementary metal oxide semiconductor) camera including a CMOS image sensor, or any other camera.

Transmitter 12 transmits, as the illumination pattern, the moving image captured by imager 11. In more detail, transmitter 12 sequentially transmits frames that are included in the moving image captured by imager 11. Transmitter 12 is, specifically, a communication module (communication circuit) for wired communication, or a communication module (communication circuit) for wireless communication. Note that the standard for communication between transmitter 12 and receiver 21 is not particularly limited. In the case where wireless communication is performed between transmitter 12 and receiver 21, a communication standard such as a standard for specified low power radio which supports the 920 MHz frequency band, ZigBee (registered trademark), Bluetooth (registered trademark), or Wi-Fi (registered trademark) is used.

Next, lighting apparatus 20 is described. Lighting apparatus 20 is, for example, a device that illuminates the interior of a room, and includes receiver 21, light source 22, optical system 23, light modulator 24, illuminator 25, controller 26, storage 27, and detector 28.

Receiver 21 sequentially receives frames that are included in the illumination pattern which changes with time. Specifically, receiver 21 is a communication module (communication circuit) paired with transmitter 12.

Light source 22 emits white light. Specifically, light source 22 includes a discharge lamp or a solid-state light-emitting element such as a light-emitting diode (LED), a semiconductor laser, or an organic or inorganic EL (electroluminescent) element.

Optical system 23 is for guiding to light modulator 24 light emitted by light source 22. Specifically, optical system 23 is a single-stage optical system which is used in a projector or the like in Embodiment 1, but may be a three-stage optical system which is used in a projector or the like. Note that specific examples of optical system 23 include optical members such as various lenses (e.g., a collimating lens, an integrator lens, and a condenser lens), various mirrors (a reflective mirror and a dichroic mirror), and a polarization beam splitter.

Every time receiver 21 receives a frame, light modulator 24 modulates the light emitted from the light source, using the received frame, based on control by controller 26. In other words, light modulator 24 converts the light guided by optical system 23 to light modulator 24 into light that corresponds to the illumination pattern, and outputs the light. Specifically, light modulator 24 is a transmissive liquid-crystal panel on which the illumination pattern is displayed, but may be a micromirror array or a reflective liquid-crystal panel. Note that light modulator 24 includes three transmissive liquid-crystal panels in the case where the three-stage optical system is used as optical system 23.

In Embodiment 1, when detector 28 detects an interruption in the reception of frames at receiver 21, light modulator 24 modulates the light emitted from light source 22, sequentially using two or more consecutive frames stored into storage 27 during a predetermined period of time, based on control by controller 26. Details of such an operation performed by light modulator 24 are described later.

Illuminator 25 emits the modulated light as illuminating light. Specifically, illuminator 25 is a projection lens though which light is projected onto an object.

Controller 26 is a control device that turns on and off light source 22 and controls light modulator 24. Furthermore, controller 26 stores the illumination pattern (frames) into storage 27. Specifically, a processor, a microcomputer, a dedicated circuit, or the like is used as controller 26. Details of an operation performed by controller 26 are described later.

Storage 27 is a storage device in which the illumination pattern (frames) received by receiver 21 is stored. The frames are stored by way of controller 26. The illumination pattern stored in storage 27 is used as a backup illumination pattern which is to be used in the modulation by light modulator 24 when an interruption in the reception of frames occurs. Specifically, a semiconductor memory or the like is used as storage 27. In storage 27, a control program of controller 26, for example, is also stored.

Detector 28 detects an interruption in the reception of frames at receiver 21. Specifically, a processor, a microcomputer, a dedicated circuit, or the like is used as detector 28.

[Operation]

Next, an operation performed by lighting apparatus 20 is described.

Lighting apparatus 20 performs the operation in a storage mode and the operation in a normal mode.

Figure 3:
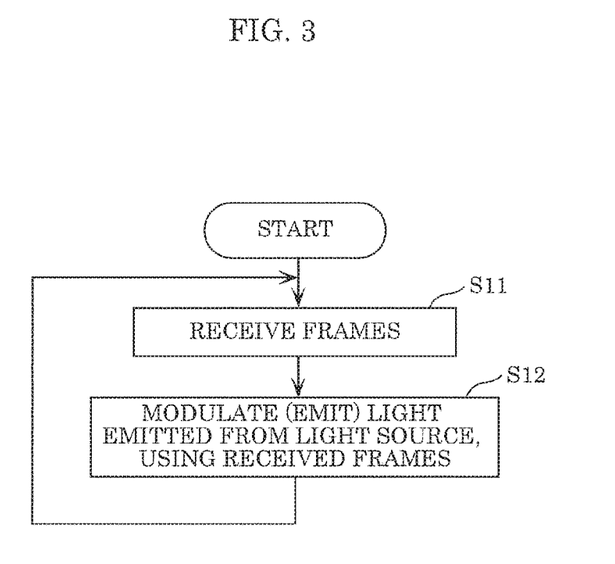
FIG. 3 is a flow chart for the operation in a normal mode.

The operation in the normal mode is the process of causing light modulator 24 to, every time receiver 21 receives a frame, modulate the light emitted from light source 22, according to the received frame. FIG. 3 is a flow chart for the operation in the normal mode.

In the operation in the normal mode, receiver 21 receives frames that are included in the illumination pattern (S11), and light modulator 24 modulates the light emitted from light source 22, according to the frames received by receiver 21, and illuminator 25 emits the modulated light (S12). The frames are not stored into storage 27 in the operation in the normal mode.

Figure 4:
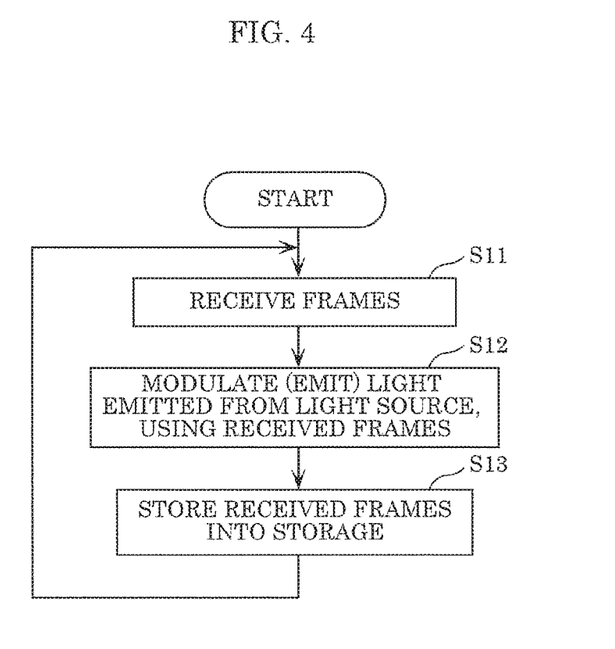
FIG. 4 is a flow chart for the operation in a storage mode.

In contrast, the operation in the storage mode is the process of causing light modulator 24 to, every time receiver 21 receives a frame, modulate the light emitted from light source 22, according to the received frame, and storing the received frame into storage unit 27. FIG. 4 is a flow chart for the operation in the storage mode.

In the operation in the storage mode, receiver 21 receives frames that are included in the illumination pattern (S11), and light modulator 24 modulates the light emitted from light source 22, according to the frames received by receiver 21, and illuminator 25 emits the modulated light (S12). Furthermore, controller 26 stores into storage 27 the frames received by receiver 21 (S13).

Figure 5:
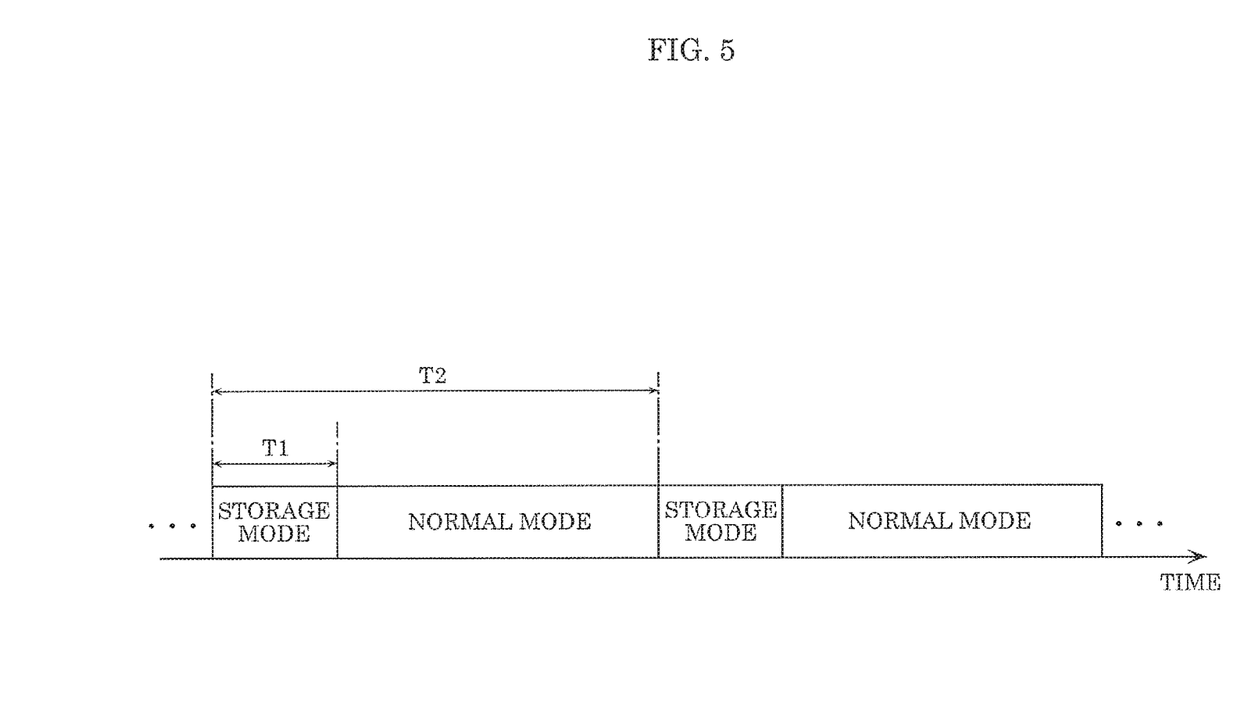
FIG. 5 illustrates the timing of switching between the operation in a normal mode and the operation in a storage mode.

The operation in the normal mode and the operation in the storage mode are performed alternately. FIG. 5 illustrates the timing of switching between the operation in the normal mode and the operation in the storage mode. As illustrated in FIG. 5, the lighting apparatus operates selectively in the normal mode and in the storage mode.

Focusing on the operation in the storage mode, the operation in the storage mode is performed for predetermined period T1 in each period T2. In other words, controller 26 periodically performs a storage control in which, every time receiver 21 receives a frame, the received frame is stored into storage 27, specifically, for predetermined period T1 in each period T2. Predetermined period T1 is, for example, 10 seconds or more and 60 seconds or less, and period T2 is, for example, 5 minutes or more and 10 minutes or less.

As just described, the frames are stored into storage 27 on and off, allowing a reduction in occupied space of storage 27.

Note that one backup illumination pattern includes two or more temporally consecutive frames stored during predetermined period T1, and more than one such backup illumination pattern is stored in storage 27.

Figure 6:
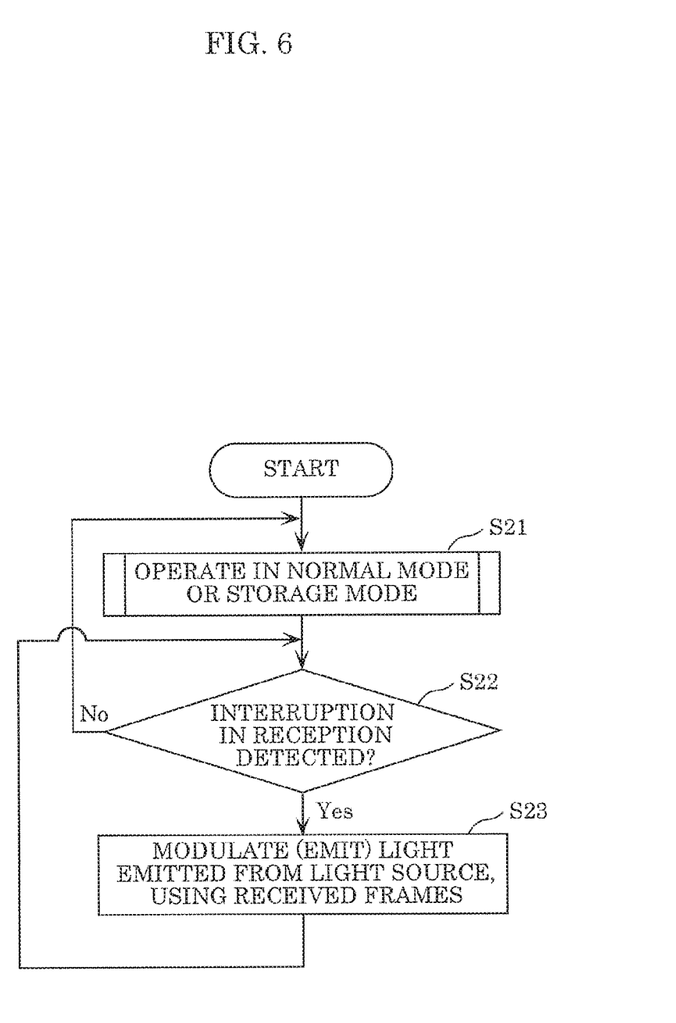
FIG. 6 is a flow chart for the operation performed by a lighting apparatus according to Embodiment 1 when an interruption in the reception of frames occurs.

When an interruption in the reception of frames occurs, the backup illumination patterns are used in the modulation by light modulator 24, in the order in which the backup illumination patterns are stored. FIG. 6 is a flow chart for the operation performed by lighting apparatus 20 when an interruption in the reception of frames occurs.

First, the operation in the normal mode illustrated in FIG. 3 or the operation in the storage mode illustrated in FIG. 4 is performed (S21). At this time, when an interruption in the reception of frames is detected (Yes in S22), light modulator 24 modulates the light emitted from light source 22, sequentially using two or more frames that are included in the backup illumination pattern stored in storage 27, and illuminator 25 emits the modulated light (S23). Hereinafter, the operation in Step S23 is referred to also as the operation in a communication-interrupted mode.

In the case where no interruption in the reception of frames is detected (No in S22) during the period when the operation in the normal mode or the operation in the storage mode is performed (S21), the operation in the normal mode or the operation in the storage mode continues (S21).

Furthermore, in the case where an interruption in the reception of frames is detected (Yes in S22) during the period when the operation in the communication-interrupted mode is performed (823), the operation in the communication-interrupted mode continues (S23). In the case where no interruption in the reception of frames is detected (No in S22) during the period when the operation in the communication-interrupted mode is performed (S23), the operation in the normal mode or the operation in the storage mode is performed (S21).

This means that the operation in the communication-interrupted mode is performed until the communication state returns to a normal state in which the frames can be received.

As described above, lighting apparatus 20 included in lighting system 100 is capable of continuing modulation of the light emitted from light source 22, using the backup illumination pattern, even in the period in which the frames cannot be received. Since the illuminating light changes naturally (the illumination state is not fixed) without suddenly disappearing or unnaturally stopping even in the period in which receiver 21 cannot receive the frames, lighting apparatus 20 is capable of reducing discomfort for a user.

Here, as described above, one backup illumination pattern includes two or more temporally consecutive frames stored during predetermined period T1. This means that one backup illumination pattern has a length of predetermined period T1. Therefore, if the period in which receiver 21 cannot receive the frames (hereinafter referred to also as an interrupted period) exceeds predetermined period T1, more than one illumination pattern may be used, or one backup illumination pattern may be repeatedly used. In the case where one backup illumination pattern is repeatedly used, use of the frame at the end in the backup illumination pattern is followed by use of the first frame of the backup illumination pattern, and subsequent frames in the backup illumination pattern are sequentially used again.

This allows the illuminating light to change naturally without suddenly disappearing or unnaturally stopping even when the period in which receiver 21 cannot receive the frames is long, and therefore lighting apparatus 20 is capable of reducing discomfort for a user.

[Variation 1]

Since the operation in the storage mode is periodically performed, more than one backup illumination pattern is stored into storage 27. Here, light modulator 24 performs the modulation, for example, using the backup illumination pattern stored at the timing closest to the interrupted period, that is, immediately before the interrupted period. Controller 26 may, however, determine a level of priority of each of the backup illumination patterns. Light modulator 24 may then modulate the light emitted from light source 22, sequentially using two or more frames that are included in the backup illumination pattern having the highest level of priority, among the backup illumination patterns stored in storage 27, in the interrupted period. The following describes an example in which degrees of priority of the backup illumination patterns are determined.

Figure 7:
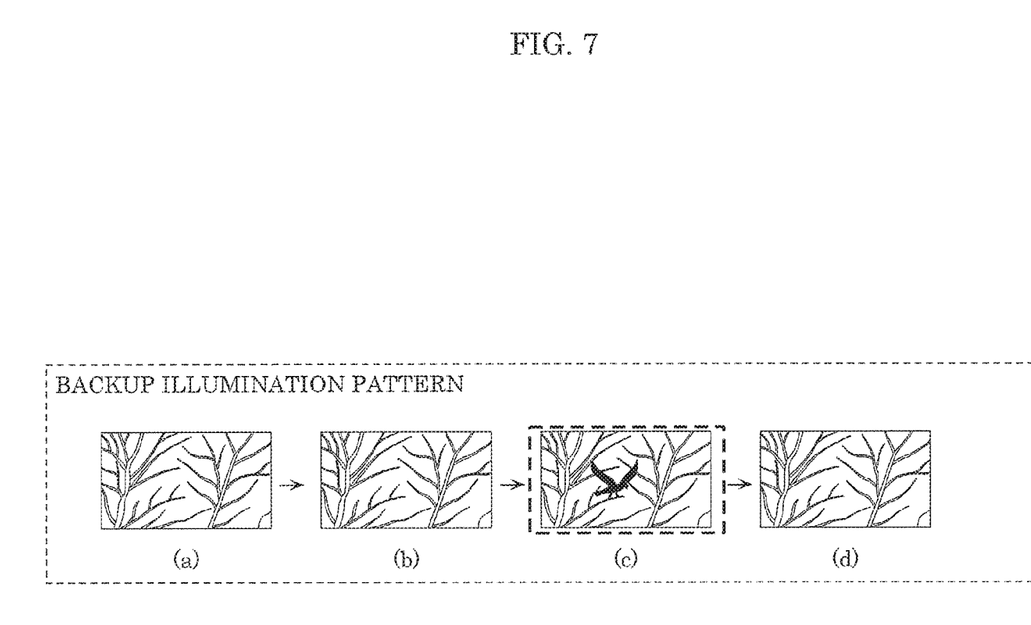
FIG. 7 illustrates a backup illumination pattern in which an object has been detected.

For example, controller 26 may detect an object for each of a plurality of backup illumination patterns stored in storage 27, and determine a level of priority of each of the backup illumination patterns based on a total number of detected objects. FIG. 7 illustrates a backup illumination pattern in which an object has been detected.

In FIG. 7, frames (a) to (d) which are included in one backup illumination pattern are arranged in the order in which the frames are stored into storage 27. Frame (c) includes a large shadow (for example, a figure of a bird). Use of such a backup illumination pattern in the light modulation in the interrupted period would be likely to cause discomfort for a user. Particularly when the backup illumination pattern is repeatedly used, the effect on a user would be noticeable.

Therefore, controller 26 may detect such a large shadow as an object. In this case, controller 26 detects, as an object in a frame, a region of a size greater than or equal to a predetermined number of pixels in the frame where pixels having luminance values lower than or equal to a predetermined value are gathered.

Note that an object appearing across two or more frames is counted as one object. In this case, whether or not an object appearing across two or more frames is one object is determined based on an amount of movement of the object between the frames and a change in the size of the object between the frames.

Specifically, controller 26 sets a backup illumination pattern including a larger number of objects detected in a manner such as that described above to a lower level of priority. Thus, a backup illumination pattern including a larger number of objects is used less in the light modulation in the interrupted period. This means that a backup illumination pattern that is likely to cause discomfort for a user is used less in the interrupted period.

Furthermore, controller 26 may set a backup illumination pattern in which a change in a total number of objects is larger to a lower level of priority. This is because a backup illumination pattern in which a change in a total number of objects is large is thought to be likely to cause a discomfort for a user due to, for example, unexpected appearance of an object.

Note that the above-described method of detecting an object (a large shadow) is an example. Controller 26 may detect an object other than a shadow. In the detection of an object, an existing method of detecting an object including edge detection and pattern matching may be applied.

Figure 8:
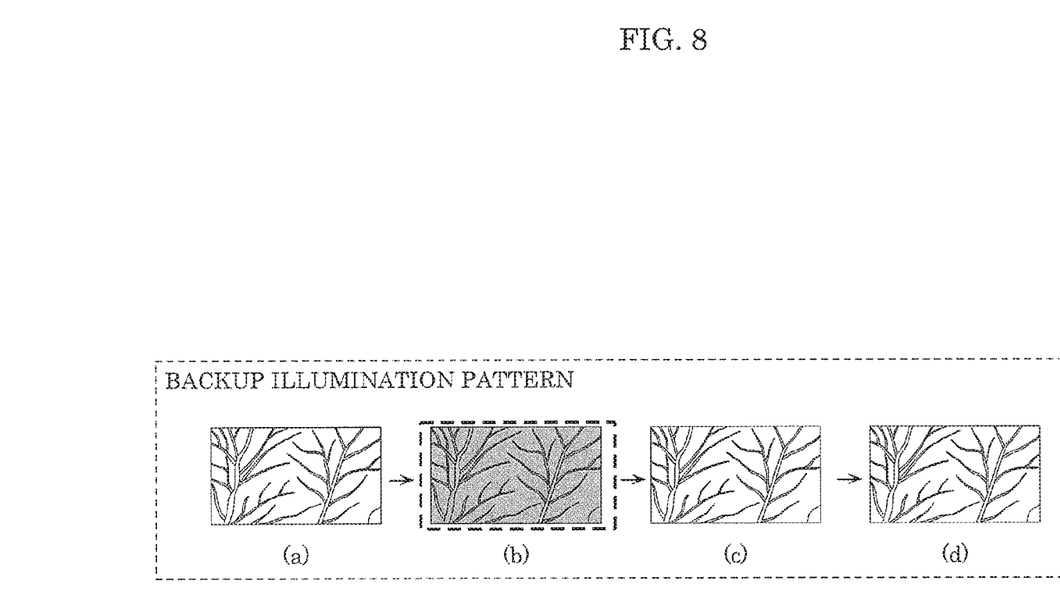
FIG. 8 illustrates a backup illumination pattern in which a change in the average luminance is large.

Furthermore, controller 26 may calculate an average luminance of the frames that are included in each of the backup illumination patterns stored in storage 27, and determine a level of priority of each of the backup illumination patterns based on the calculated average luminance. FIG. 8 illustrates a backup illumination pattern in which a change in the average luminance is large. Note that the average luminance means an average of luminance values of pixels included in a frame.

In FIG. 8, frames (a) to (d) which are included in one backup illumination pattern are arranged in the order in which the frames are stored into storage 27, and frame (d) has a low average luminance. If such a backup illumination pattern with an unexpected decrease in the average luminance is used in the light modulation in the interrupted period, this would be likely to cause discomfort for a user. Particularly when the backup illumination pattern is repeatedly used, the effect on a user would be noticeable.

Therefore, controller 26 may set a backup illumination pattern in which a change in the average luminance is larger to a lower level of priority. Specifically, controller 26 may calculate an average luminance of each of the frames that are included in a backup illumination pattern, and set a backup illumination pattern with a larger variation in the average luminance to a lower level of priority.

According to the operation performed by controller 26 as described above, a backup illumination pattern that is not likely to cause discomfort for a user is preferentially used. Thus, lighting apparatus 20 is capable of reducing discomfort for a user. Note that the above-described level of priority may be stored in storage 27 as priority information separately from the backup illumination patterns. The priority information may be updated every time a new backup illumination pattern is stored.

[Variation 2]

Figure 9:
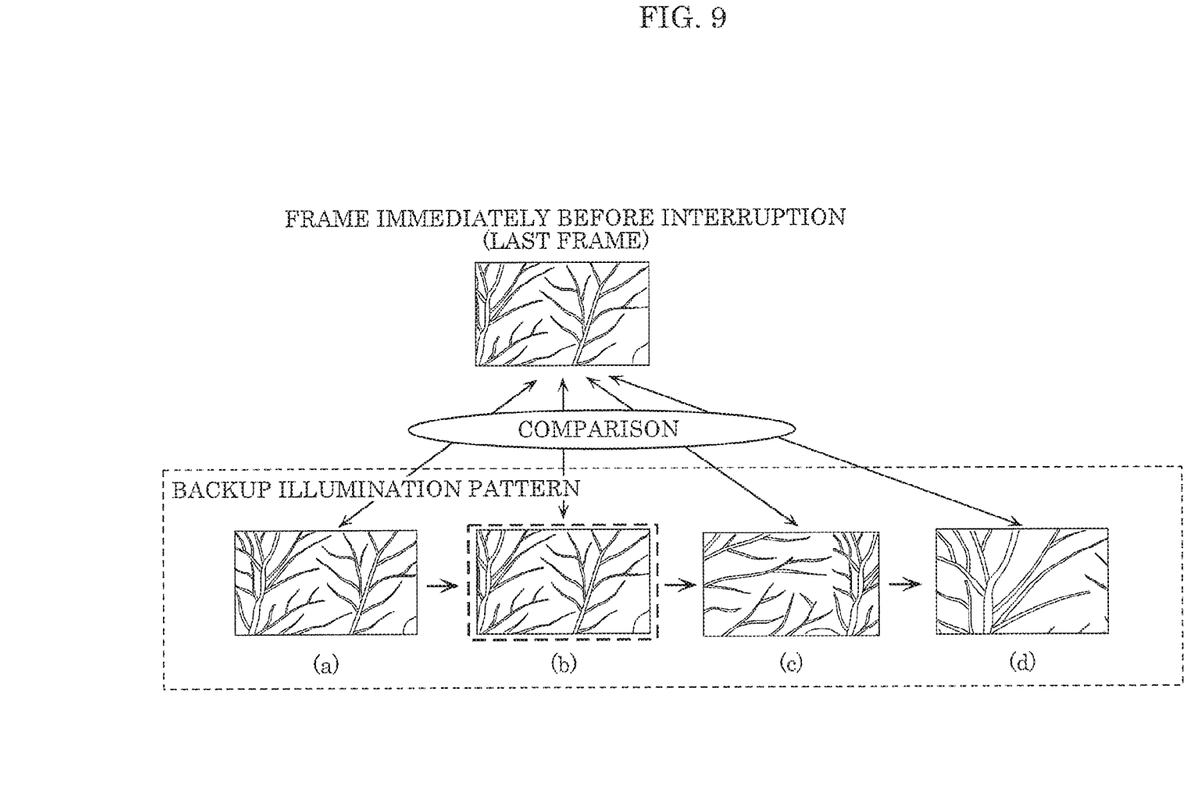
FIG. 9 illustrates calculation of a degree of similarity.

Although the frames that are included in the backup illumination pattern are used in the modulation by light modulator 24, in the order in which the frames are stored, in the above embodiments, the frames may be used in the order starting with an in-between frame. For example, the frames that are included in the backup illumination pattern may be used in the modulation by light modulator 24, in the order starting with one of the frames that has the highest degree of similarity with the frame received immediately before an interruption in the reception of the frames (hereinafter referred to also as the last frame). FIG. 9 illustrates calculation of a degree of similarity.

In FIG. 9, frames (a) to (d) included in one backup illumination pattern are arranged in the order in which the frames are stored into storage 27. When an interruption in the reception of the frames occurs, controller 26 compares each of the frames (a) to (d) included in the backup illumination pattern with the last frame, to calculate a degree of similarity of each of the frames that are included in the backup illumination pattern.

For example, controller 26 sets a frame having a smaller difference in the average luminance with the last frame to a higher degree of similarity. Furthermore, controller 26 may calculate a SAD (sum of absolute difference) of each frame with the last frame, and set a frame having a smaller SAD to a higher degree of similarity.

Light modulator 24 then modulates the light emitted from light source 22, sequentially using two or more frames in the order starting with one of the two or more frames that has the highest degree of similarity with the last frame, based on control by controller 26.

According to the operation performed by controller 26 as described above, the last frame and the backup illumination pattern are likely to be smoothly connected to each other, and therefore it is possible to reduce discomfort for a user.

Note that when an interruption in the reception of the frames occurs, light modulator 24 may modulate the light emitted from light source 22, using a backup illumination pattern including a frame having the highest degree of similarity with the last frame among the backup illumination patterns.

This configuration also allows the last frame and the backup illumination pattern to be smoothly connected to each other, and therefore makes it possible to reduce discomfort for a user.

[Variation 3]

In the case where one backup illumination pattern is repeatedly used in the interrupted period, the first frame is used next to the frame at the end in the backup illumination pattern. Therefore, the first frame and the frame at the end are desired to be similar to each other.

Figure 10:
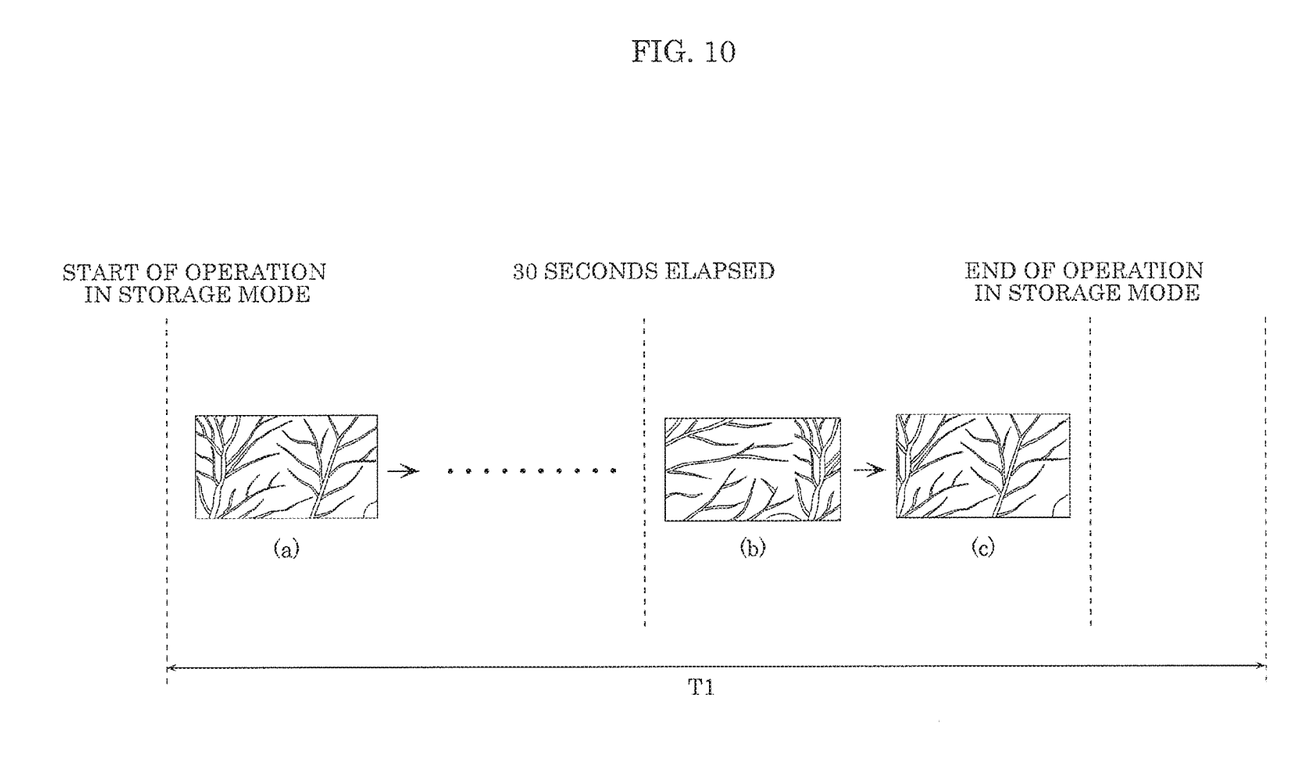
FIG. 10 illustrates stoppage of the process of storing frames into a storage.

Therefore, after storing a predetermined number of frames into storage 27 in the operation in the storage mode, controller 26 may stop storing frames into storage 27 upon storing, into storage 27, a frame having a degree of similarity with the frame stored first into storage 27 in the operation in the storage mode that is higher than a predetermined value. This means that controller 26 may stop storing frames before the end of predetermined period T1. FIG. 10 illustrates stoppage of the process of storing frames into storage 27.

The above-stated predetermined number is set to ensure that a certain number of frames are stored. For example, when predetermined period T1 is one minute, the above-stated predetermined number is set to a total number of frames that are received, for example, for 30 seconds. In this case, at the point when 30 seconds passed after the start of the operation in the storage mode, controller 26 starts calculating a degree of similarity of a stored frame with first frame (a) illustrated in FIG. 10. Note that the degree of similarity can be calculated based on a frame-to-frame difference in the average luminance, a frame-to-frame SAD, etc., as described in Variation 2.

Specifically, as illustrated in FIG. 10, controller 26 stores into storage 27 frame (b) received after the lapse of 30 seconds, and calculates a degree of similarity of stored frame (b) with first frame (a). When the calculated degree of similarity of the frame is lower than or equal to the predetermined value, controller 26 continues the operation in the storage mode. Note that the predetermined value may be empirically or experimentally determined as appropriate.

Specifically, controller 26 stores into storage 27 next frame (c) received after frame (b), and calculates a degree of similarity between first frame (a) and stored frame (c). When the calculated degree of similarity is higher than the predetermined value, controller 26 causes the lighting apparatus to stop the operation in the storage mode and operate in the normal mode. This means that a next frame received after frame (c) is not stored into storage 27.

According to the operation performed by controller 26 as described above, the first frame and the frame at the end in the backup illumination pattern that is stored into storage 27 are similar to each other, and therefore the backup illumination pattern is suitable for being repeatedly used. Thus, the backup illumination pattern that is not likely to cause discomfort for a user is stored.

Note that when a frame having a degree of similarity that is higher than the predetermined value is not obtained during predetermined period T1, controller 26 completes the operation in the storage mode at the end of predetermined period T1 and then causes the lighting apparatus to operate in the normal mode as normal. The operation in the storage mode may, however, continue (be extended) until a frame having a degree of similarity that is higher than the predetermined value is obtained.

[Variation 4]

Although the operation in the storage mode is periodically performed in the above embodiments, lighting apparatus 20 may buffer frames constantly. Specifically, in lighting apparatus 20, a received frame is stored into storage 27, and after a predetermined number of frames are stored into storage 27, the frames may be used in the modulation in the order starting with the frame stored first.

The buffering such as that described above allows the modulation to continue for a while even when an interruption in the reception of the frames occurs, and therefore makes it possible to reduce discomfort for a user.

Lighting apparatus 20 may operate selectively in a first mode in which the operation in the storage mode is periodically performed (the operation represented in the flow chart of FIG. 6) and in a second mode in which the frames are buffered constantly as just described. The operation in the second mode is, in other words, an operation in which, every time receiver 21 receives a frame, the received frame is stored into storage 27. When controller 26 causes the lighting apparatus to operate in the second mode, light modulator 24 modulates the light emitted from the light source, sequentially using the frames stored in storage 27.

Thus, lighting apparatus 20 is capable of switching between the operation in the first mode and the operation in the second mode. Note that the first mode and the second mode are selected by a user, for example, using a user interface (not illustrated in FIG. 2) such as a remote control of lighting apparatus 20.

Advantageous Effects, Etc.

As described above, lighting apparatus 20 includes: light source 22; receiver 21 which sequentially receives frames that are included in an illumination pattern which changes with time; and light modulator 24 which, every time receiver 21 receives a frame among the frames, modulates the light emitted from light source 22, using the received frame. Furthermore, lighting apparatus 20 includes: illuminator 25 which emits the modulated light; storage 27; controller 26 which periodically performs a storage control which continues for a predetermined period of time and in which, every time receiver 21 receives a frame among the frames, the received frame is stored into storage 27; and detector 28 which detects an interruption in the reception of the frames at receiver 21. When detector 28 detects an interruption in the reception of the frames at receiver 21, light modulator 24 modulates the light emitted from light source 22, sequentially using, among the frames, two or more consecutive frames stored into storage 27 during the predetermined period of time.

This allows lighting apparatus 20 to continue modulation of the light emitted from light source 22, using the backup illumination pattern which is an illumination pattern used in the modulation in the past, even in the period in which the frames cannot be received. Since the illuminating light changes naturally without suddenly disappearing or unnaturally stopping even in the period in which receiver 21 cannot receive the frames, lighting apparatus 20 is capable of reducing discomfort for a user.

Furthermore, when detector 28 detects an interruption in the reception of the frames at receiver 21, light modulator 24 may modulate the light emitted from light source 22, repeatedly using the two or more frames.

This allows the illuminating light to change naturally even when the period in which receiver 21 cannot receive the frames is long, and therefore lighting apparatus 20 is capable of reducing discomfort for a user.

Furthermore, a plurality of backup illumination patterns each including two or more frames may be stored into storage 27, and controller 26 may determine a level of priority of each of the plurality of backup illumination patterns stored in storage 27. When detector 28 detects an interruption in the reception of the frames at receiver 21, then light modulator 24 may modulate the light emitted from light source 22, sequentially using two or more frames that are included in a backup illumination pattern having the highest level of priority, among the plurality of backup illumination patterns stored in storage 27.

Thus, in lighting apparatus 20, when an interruption in the reception of the frames occurs, the light emitted from light source 22 can be modulated using the backup illumination pattern having the highest level of priority.

Controller 26 may detect, for each of the plurality of backup illumination patterns stored in storage 27, an object that appears in the backup illumination pattern, and determine the level of priority of each of the plurality of backup illumination patterns based on a total number of detected objects.

In this case, lighting apparatus 20 can increase the level of priority of a backup illumination pattern including a small number of objects, for example, so that discomfort for a user which is due to the use of a backup illumination pattern can be reduced.

Furthermore, controller 26 may calculate an average luminance of each of the two or more frames that are included in each of the plurality of backup illumination patterns stored in storage 27, and determine the level of priority of each of the plurality of backup illumination patterns based on the calculated average luminance.

In this case, lighting apparatus 20 can increase the level of priority of a backup illumination pattern in which the change in the average luminance is small, for example, so that discomfort for a user which is due to the use of a backup illumination pattern can be reduced.

When detector 28 detects an interruption in the reception of the frames at receiver 21, light modulator 24 may modulate the light emitted from light source 22, sequentially using the two or more frames in the order starting with one of the two or more frames that has the highest degree of similarity with one of the frames that has been received immediately before the interruption in the reception of the frames.

In this case, the frame received immediately before the interruption in the reception of the frames and the backup illumination pattern are likely to be smoothly connected to each other, and therefore it is possible to reduce discomfort for a user.

Furthermore, controller 26 may cause the lighting apparatus to operate selectively in the first mode in which the storage control is periodically performed and in the second mode in which, every time receiver 21 receives a frame among the frames, the received frame is stored into storage 27. When controller 26 causes the lighting apparatus to operate in the second mode, light modulator 24 may modulate the light emitted from the light source, sequentially using the frames stored in storage 27.

Thus, lighting apparatus 20 is capable of switching between the operation in the first mode and the operation in the second mode. Note that even in the operation in the second mode, the modulation can continue when an interruption in the reception of the frames occurs, and therefore, it is possible to reduce discomfort for a user.

Furthermore, the illumination pattern may be a moving image.

Thus, lighting apparatus 20 is capable of emitting light modulated according to the moving image.

Furthermore, after storing a predetermined number of frames into storage 27 in the storage control, controller 26 may stop storing the frames into storage 27 upon storing, into storage 27, a frame having a degree of similarity with a frame stored first into storage 27 in the storage control that is higher than a predetermined value.

Furthermore, lighting system 100 includes: lighting apparatus 20; imager 11; and transmitter 12 which transmits a moving image captured by imager 11, as the illumination pattern to receiver 21.

Such lighting system 100 is capable of continuing modulation of the light emitted from light source 22, using the backup illumination pattern, even in the period in which the frames cannot be received. Since the illuminating light changes naturally without suddenly disappearing or unnaturally stopping even in the period in which receiver 21 cannot receive the frames, lighting system 100 is capable of reducing discomfort for a user.

Other Embodiments

Although the embodiments have been described above, the present disclosure is not limited to the above-described embodiments.

For example, the optical system described in the above embodiments is an example, and any optical system may be used in the lighting apparatus. In the case where a blue LED or a blue laser is used as the light source of the lighting apparatus, for example, an optical system including a phosphor wheel may be used.

Furthermore, although the receiver receives, as the illumination pattern, a moving image captured by the imaging apparatus in the above embodiments, the receiver may receive artificially produced video as the illumination pattern.

Furthermore, the illumination pattern received by the receiver may be subject to image processing, such as a process of conversion into a grayscale image and a feathering process, before being used in modulation of the light emitted from the light source.

Each of the elements such as the controller and the detector in the above-described embodiments may be configured in the form of a dedicated hardware product, or may be realized by executing a software program suitable for the element. Each of the elements may be realized by means of a program executing unit, such as a CPU and a processor, reading and executing the software program recorded on a recording medium such as a hard disk or a semiconductor memory.

Furthermore, each of the elements may be a circuit (or an integrated circuit). These circuits may be configured as a single circuit and, alternatively, may be individual circuits. Moreover, these circuits may be ordinary circuits and, alternatively, may be specialized circuits.

Moreover, general or specific aspects of the present disclosure may be realized as a system, device, method, integrated circuit, computer program, non-transitory computer-readable medium such as a CD-ROM, or any given combination thereof. For example, one aspect of the present disclosure may be realized as a light modulation method which the lighting apparatus or the lighting system executes. One aspect of the present disclosure may also be realized as a program for causing a computer to execute the modulation method.

Furthermore, the processing order of the processes in the operations performed by the lighting apparatus, described in the above embodiments, is an example. The processing order of the processes may be changed, and the processes may be performed in parallel.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus, comprising:
a light source;
a receiver which sequentially receives frames that are included in an illumination pattern which changes with time;
a light modulator which, in a normal mode, every time the receiver receives a frame among the frames, modulates light emitted from the light source, using the received frame;
an illuminator which emits the modulated light;
a storage;
a controller which, when not in the normal mode, periodically performs a storage control which continues for a predetermined period of time and in which, every time the receiver receives a frame among the frames, the received frame is stored into the storage; and
a detector which detects an interruption in reception of the frames at the receiver, wherein when the detector detects an interruption in the reception of the frames at the receiver, the light modulator modulates the light emitted from the light source, sequentially using, among the frames, two or more consecutive frames stored into the storage, and when the receiver resumes the reception of the frames, the light modulator modulates, every time the receiver receives a frame among the frames, the light emitted from the light source, using the received frame.

2. The lighting apparatus according to claim 1, wherein when the sensor detects an interruption in the reception of the frames at the receiver, the light modulator modulates the light emitted from the light source, repeatedly using the two or more consecutive frames.

3. A lighting apparatus, comprising:

a light source;

a receiver which sequentially receives frames that are included in an illumination pattern which changes with time;

a light modulator which, in a normal mode, every time the receiver receives a frame among the frames, modulates light emitted from the light source, using the received frame;

an illuminator which emits the modulated light;

a storage;

a controller which, when not in the normal mode, periodically performs a storage control which continues for a predetermined period of time and in which, every time the receiver receives a frame among the frames, the received frame is stored into the storage; and a detector which detects an interruption in reception of the frames at the receiver, wherein when the detector detects an interruption in the reception of the frames at the receiver, the light modulator modulates the light emitted from the light source, sequentially using, among the frames, two or more consecutive frames stored into the storage, wherein the two or more consecutive frames stored in the storage are grouped as a plurality of backup illumination patterns, the controller determines a level of priority of each of the plurality of backup illumination patterns, and when the detector detects an interruption in the reception of the frames at the receiver, the light modulator modulates the light emitted from the light source, sequentially using the two or more consecutive frames that are included in a backup illumination pattern having a highest level of the priority, among the plurality of backup illumination patterns.

4. The lighting apparatus according to claim 3, wherein the controller detects, for each of the plurality of backup illumination patterns, an object that appears in the backup illumination pattern, and determines the level of priority of each of the plurality of backup illumination patterns based on a total number of detected objects.

5. The lighting apparatus according to claim 3, wherein the controller calculates an average luminance of each of the two or more consecutive frames that are included in each of the plurality of backup illumination patterns, and determines the level of priority of each of the plurality of backup illumination patterns based on the calculated average luminance.

6. A lighting apparatus, comprising:

a light source;

a receiver which sequentially receives frames that are included in an illumination pattern which changes with time;

a light modulator which, in a normal mode, every time the receiver receives a frame among the frames, modulates light emitted from the light source, using the received frame;

an illuminator which emits the modulated light;

a storage;

a controller which, when not in the normal mode, periodically performs a storage control which continues for a predetermined period of time and in which, every time the receiver receives a frame among the frames, the received frame is stored into the storage; and a detector which detects an interruption in reception of the frames at the receiver, wherein when the detector detects an interruption in the reception of the frames at the receiver, the light modulator modulates the light emitted from the light source, sequentially using, among the frames, two or more consecutive frames stored into the storage, and wherein when the detector detects an interruption in the reception of the frames at the receiver, the light modulator modulates the light emitted from the light source, sequentially using the two or more consecutive frames in an order starting with one of the two or more consecutive frames that has a highest degree of similarity with one of the frames that has been received immediately before the interruption in the reception of the frames.

7. A lighting apparatus, comprising:

a light source;

a receiver which sequentially receives frames that are included in an illumination pattern which changes with time;

a light modulator which, in a normal mode, every time the receiver receives a frame among the frames, modulates light emitted from the light source, using the received frame;

an illuminator which emits the modulated light;

a storage;

a controller which, when not in the normal mode, periodically performs a storage control which continues for a predetermined period of time and in which, every time the receiver receives a frame among the frames, the received frame is stored into the storage; and a detector which detects an interruption in reception of the frames at the receiver, wherein when the detector detects an interruption in the reception of the frames at the receiver, the light modulator modulates the light emitted from the light source, sequentially using, among the frames, two or more consecutive frames stored into the storage, wherein the controller causes the lighting apparatus to operate selectively in a first mode and in a second mode, the first mode being a mode in which the storage control is periodically performed, and the second mode being a mode in which, every time the receiver receives a frame among the frames, the received frame is stored into the storage, and when the controller causes the lighting apparatus to operate in the second mode, the light modulator modulates the light emitted from the light source, sequentially using the frames stored in the storage.

8. The lighting apparatus according to claim 1, wherein the illumination pattern is a moving image.

9. A lighting apparatus, comprising:
a light source;
a receiver which sequentially receives frames that are included in an illumination pattern which changes with time;
a light modulator which, in a normal mode, every time the receiver receives a frame among the frames, modulates light emitted from the light source, using the received frame;
an illuminator which emits the modulated light;
a storage;
a controller which, when not in the normal mode, periodically performs a storage control which continues for a predetermined period of time and in which, every time the receiver receives a frame among the frames, the received frame is stored into the storage; and
a detector which detects an interruption in reception of the frames at the receiver,
wherein when the detector detects an interruption in the reception of the frames at the receiver, the light modulator modulates the light emitted from the light source, sequentially using, among the frames, two or more consecutive frames stored into the storage, and
wherein after storing a predetermined number of frames into the storage in the storage control, the controller stops storing the frames into the storage upon storing, into the storage, a frame having a degree of similarity with a frame stored first into the storage in the storage control that is higher than a predetermined value.

10. A lighting system, comprising:
the lighting apparatus according to claim 1;
an imager; and
a transmitter which transmits a moving image captured by the imager, as the illumination pattern to the receiver.

* * * * *